(12) United States Patent
Perkins et al.

(10) Patent No.: US 7,570,671 B2
(45) Date of Patent: Aug. 4, 2009

(54) METHOD AND APPARATUS FOR DEPLOYING FORWARD ERROR CORRECTION IN OPTICAL TRANSMISSION NETWORKS AND THE DEPLOYMENT OF PHOTONIC INTEGRATED CIRCUIT (PIC) CHIPS WITH THE SAME

(75) Inventors: Drew D. Perkins, Saratoga, CA (US); Michael D. Jarchi, West Hills, CA (US); Satish K. Sridharan, West Hills, CA (US)

(73) Assignee: Infinera Corporation, Sunnyvale, CA (US)

( * ) Notice: Subject to any disclaimer, the term of this patent is extended or adjusted under 35 U.S.C. 154(b) by 1139 days.

(21) Appl. No.: 10/712,732

(22) Filed: Nov. 12, 2003

(65) Prior Publication Data

US 2004/0096213 A1    May 20, 2004

Related U.S. Application Data

(60) Provisional application No. 60/428,078, filed on Nov. 20, 2002.

(51) Int. Cl.
*H04J 3/04* (2006.01)

(52) U.S. Cl. ................................. 370/535; 370/465

(58) Field of Classification Search .............. 370/535, 370/395.5, 465, 466, 471, 474
See application file for complete search history.

(56) References Cited

U.S. PATENT DOCUMENTS

| | | | |
|---|---|---|---|
| 5,065,396 A | | 11/1991 | Castellano et al. |
| 5,191,410 A | * | 3/1993 | McCalley et al. ........... 725/114 |
| 5,195,092 A | * | 3/1993 | Wilson et al. ............... 725/146 |
| 6,185,022 B1 | | 2/2001 | Harasawa |
| 6,229,824 B1 | * | 5/2001 | Marko ........................ 370/477 |
| 6,341,023 B1 | * | 1/2002 | Puc ............................. 398/79 |
| 6,356,528 B1 | * | 3/2002 | Lundby et al. .............. 370/209 |
| 6,433,904 B1 | | 8/2002 | Swanson et al. |
| 6,747,948 B1 | * | 6/2004 | Sarraf et al. ................ 370/210 |
| 6,985,648 B2 | * | 1/2006 | Kish et al. .................... 385/14 |
| 6,990,624 B2 | * | 1/2006 | Dohmen et al. ............. 714/785 |
| 7,058,246 B2 | * | 6/2006 | Joyner et al. ................. 385/14 |
| 7,295,783 B2 | * | 11/2007 | Singh et al. ................. 398/175 |

(Continued)

*Primary Examiner*—Brenda Pham
(74) *Attorney, Agent, or Firm*—W. Douglas Carothers, Jr.; David L. Soltz

(57) ABSTRACT

An apparatus and method for uniformly sharing across a plurality of channel signals FEC coding gain which may be achieved through FEC encoding of a higher baud rate electrical data signal or through multiplexed or combined electrical data signals from multiple data sources prior to their subsequent demultiplexing and separate generation into optical channel signals which are multiplexed and launched onto an optical transmission medium. The optical signal generation is achieved through reverse multiplexing of the higher baud rate data signal or of the multiplexed, FEC encoded plural data signals. Effectively, the coding gain power of the FEC encoder is spread over all the signal channels so that each channel can potentially benefit from performance above the average coding gain thereby increasing the coding gain of the worst noise signal channel and correspondingly reducing its BER at the receiver so that, now, the combined multiple channel signals may be propagated further along the optical transmission medium before signal interception is required, such as required channel signal regeneration (3R). By coding gain averaging, the coding gain is taken from the lesser noise affected channels and spread over all the channels so the higher noised ridden channels obtain an effective increase in coding gain which corresponds to a higher reduction in BER at the optical receiver terminal.

33 Claims, 7 Drawing Sheets

U.S. PATENT DOCUMENTS

| | | | |
|---|---|---|---|
| 2002/0003813 A1* | 1/2002 | Marko | 370/477 |
| 2002/0012141 A1 | 1/2002 | Traverso | |
| 2002/0114358 A1 | 8/2002 | Roberts et al. | |
| 2008/0063407 A1* | 3/2008 | Singh et al. | 398/140 |

* cited by examiner

METHOD AND APPARATUS FOR DEPLOYING FORWARD ERROR CORRECTION IN OPTICAL TRANSMISSION NETWORKS AND THE DEPLOYMENT OF PHOTONIC INTEGRATED CIRCUIT (PIC) CHIPS WITH THE SAME

REFERENCE TO RELATED APPLICATION

This application claims priority to prior provisional patent application, Ser. No. 60/428,078, filed Nov. 20, 2002, which provisional patent application is incorporated herein by its reference.

BACKGROUND OF THE INVENTION

1. Field of the Invention

This invention relates generally to forward error correction (FEC) encoding and decoding in optical transmission systems and more particularly to FEC coding to provide for "averaging" of the bit error rate (BER) across multiple signal channels.

2. Description of the Related Art

There is an ever increasing demand on wavelength division multiplexing systems for increase in capacity over the existing optical telecommunication fiber transport systems by increasing the rate and distance at which data signals are transmitted. It is not an easy approach to improve system performance by merely adding more signal channels, decrease the channel wavelength spacing, increase the channel power or increase the data signal rate of transmission, as this usually enhances further system losses due to the nonlinearity effects of the fiber transport medium, such as chromatic dispersion (CD), polarization mode dispersion (PMD) and signal crosstalk. Many techniques have been devised to increase system performance in order to increase the signal reach of the network thereby rendering an optical transmission network more cost effective. For example, in order to increase the signal data rate or modulated frequency toward increasing system capacity, the signal power must be correspondingly increase to achieve the same channel performance as was attained at lower signal data rates, which performance is measured as a bit error rate (BER). The deployment of optical amplifiers has been also an approach to increase the signal reach in an optical span by providing signal gain in the optical domain. This has lead to a procession of research and development to provide all-optical networks where the client signals are handled in the optical domain through out the network span, such as, all optical ADMs, crossconnects and 3R signal processing. Whether such all-optical systems will deliver higher performance at lower effective costs remains to be seen.

One manner of increasing system performance in an effective less-cost manner is the deployment of forward error correction (FEC) as known in the art. The use of FEC encoding and decoding improves system performance in a cost effective way by providing overall enhancement to the channel signals in the electrical domain by providing what is termed, coding gain, to the channels signals. Coding gain is an indication of the enhancement to signal-to-noise ratio (SNR) achieved through the use of FEC encoding. Gain coding helps to minimize phase noise or jitter as well as improve upon the effects brought about by optical nonlinearities by providing a way to provide additional information to the client payload signal that may be utilized at the receiver to reduce signal bit error rate (BER).

Thus, FEC is increasing deployed for accurately transmitting client payload in optical transmission networks. As shown in FIG. 1, FEC systems add separate redundant data in the transport signals through FEC encoding with N FEC encoders at the transmitter side from a plurality of N data sources. The FEC encoded signals are then transported over multiple network mediums which, because of its nonlinearity characteristics, provide a noisy channel for each of these signals. The FEC encoded information is decoded on the receiver side via FEC decoders, providing signal redundancy, and a means by which error correction in the electrical domain can be used to provide a higher accurate signal recovery such as channel error rates around, or smaller than, $10^{-12}$. The FEC corrected signals are provided to N data sinks which may be various types of client payload equipment for receiving the signals through tributary interfaces between the network and such equipment.

During the encoding operation, redundant signal information is added to the signal payload, usually at the end of the end of the signal payload, for example, in the case of the OTN network node interface defined in the ITU-T G.709 where it is added at the end of the optical transport unit (OTU) framing structure. The redundant information allows determination by the receiver FEC system as to whether the received data signals have been corrupted during transit through the network. If corruption has occurred, the incorrect data is detected or identified and corrected employing the coded redundant information. In particular, the FEC decoder decodes the FEC data, generates a signature of the error (syndrome) which in turn is employed to generate an error location and error value polynomial and employs the polynomial to determine the correction to be applied to the data signal.

FIG. 2 illustrates a more recent approach in the use of FEC systems. Such a system is shown in U.S. Pat. No. 6,433,904. In FIG. 2, in the optical transmitter, the data signals from the respective N signal sources are FEC encoded by corresponding N FEC encoders. The FEC encoded signals are EO converted via a corresponding series of optical transmitters, $\lambda_1$, $\lambda_2 \ldots \lambda_N$, after which the generated optical signals are multiplexed by N:1 MUX and the multiplexed signal is launched onto a network fiber medium which are N noisy channels due to the impurities of the medium. The dotted lines in FIG. 2 as well as in other figures are indicative of the respective N noisy channels along the medium. At the receiving end at the optical receiver, the optical multiplexed signal is demultiplexed by a 1:N DEMUX and the individual N optical signals are converted from optical signals to electrical signals, after which they are FEC decoded by N FEC decoders and provided to data sinks via tributary interfaces which may be, for example, client signal equipment.

Also, as illustrated in FIG. 3 herein, which is similar, in part, to FIG. 4 of U.S. Pat. No. 6,433,904, the data source may be a high bit or baud rate source which is FEC encoded and inverse multiplexed where the data signal is demultiplexed by 1:N DEMUX into multiple lower baud rate, N channel signals for signal conversion from electrical to optical signals via optical transmitters, $\lambda_1, \lambda_2 \ldots \lambda_N$, and thence the optical generated signals are optically multiplexed for transmission over the optical span. At the optical receiver, the reverse of the forgoing occurs, i.e., the multiplexed optical signal is demultiplexed by a 1:N DEMUX and the optical signals are converted into electrical signals by the optical receivers, $\lambda_1$, $\lambda_2 \ldots \lambda_N$, FEC decoded and then inverse multiplexed to provide, again, a higher baud rate signal which is provided to a data sink, such as client equipment via a client tributary interface. The purpose of FEC systems in FIGS. 3 and 4 of patent '904 is to provide for upgrade in the signal baud rate, such as from a 2.5 Gbps system to meet the requirements of a 10 Gbps system, toward reducing the effects of optical channel impairments at higher data rates in order to achieve an improved system optical signal-to-noise ratio (OSNR). As background, inverse multiplexer and demultiplexer techniques are disclosed in U.S. Pat. No. 5,065,396.

U.S. Pat. No. 6,433,904 also discloses in FIG. 7 therein, in another embodiment, a joint FEC encoder where separate signals from multiple data source are jointly FEC encoded by one FEC encoder and the jointly FEC encoded signals are separately EO converted for transmission on an optical medium. The reverse procedure is accomplished at the optical receiver.

Published U.S. patent application 2002/0114358, published on Aug. 22, 2002, discloses the FEC encoding of multiple data signals which are thereafter combined to form a single FEC encoded electrical signal which is then EO converted via an optical transmitter for transmission on an optical network medium. The reverse procedure is accomplished at the optical receiver. In order to enhance system SNR, the combiner comprises an aharmonic interleaver which interleaves the signal segments or bytes in a manner that they are aharmonic with respect to the transmission data rate. The interleaving has the effect of distributing bits or bytes with each of the separate data streams within a higher data rate signal thereby distributing the effects of noise among the separate signals which thereby effectively reducing the effective SNR across all the separate signal channels.

In the most of the foregoing FEC coding systems, system improvements to be achieved through appropriate FEC encoding is based on coding gain required for the worst case signal channel. This means that the best or better operating channels that have lower levels of jitter and noise are utilizing coding gain that is in excess of what is required or necessary. It is an object of this invention to provide a method and apparatus for the "averaging" of coding gain across all of the channels so that a portion of the coding gain extended to better channels with less noise is shared with channels suffering with more noise.

SUMMARY OF THE INVENTION

According to this invention, an apparatus and method is provided for shared FEC coding gain which is achieved through FEC encoding of a higher bit or baud rate electrical data signal prior to conversion into multiple lower bit or baud rate signals or FEC encoding of multiplexed electrical data signals prior to their generation into optical channel signals which there are optically multiplexed and launched onto an optical transmission medium. The optical signal generation is achieved through reverse multiplexing of the higher baud rate electrical data signal or the multiplexed FEC encoded signals. Effectively, the coding gain power of the FEC encoder is spread over or across all the signal channels so that each signal channel can potentially benefit from performance above the average coding gain. Thus, all the channels are aggregated at the receiver for average coding gain thereby comparatively increasing the coding gain of the worst noise case signal channel and, correspondingly, increasing receiver BER tolerance so that, now, the combined multiple channel signals may be propagated further along the optical medium before interception is required, such as required optical channel signal regeneration. By coding gain averaging, the coding gain is taken from the lesser noise affected channels and spread over all the signal channels so the higher noised ridden channels obtain an effective increase in coding gain which corresponds to a higher reduction in BER of these signals at the optical receiver terminal. Averaging coding gain provides for an efficient use of FEC power and permits the loosening of tolerances in network specifications for optical and opto electrical components employed in both optical transmitters and optical receivers.

A further feature of this invention in its broadest terms on the transmitter side in deploying forward error correction (FEC) in transmission networks is the method of FEC encoding a signal in a first domain, inverse multiplexing the first domain signal into N segments in the first domain, converting the N segments in the first domain into N segments in a second domain, and combining the second domain N segments into a combined signal in the second domain for transport on a transmission medium. On the receiver side, the method is directed to decombining a FEC encoded combined signal in a second domain and received from a transmission medium into N segments in the second domain, converting the N segments in the second domain into N segments in the first domain, inverse multiplexing the first domain N segments into a multiplexed M signal comprising M signals in the first domain, and FEC decoding the first domain multiplexed M signal. The first domain may be the electrical domain and the second domain may be the optical domain or the electrical domain. The first baud rate can be higher or lower than the second baud rate or both the first and second baud rates can be the same. The baud rates can be, for example, Kbps, Mbps, Gbps or Tbps. The conversion from the first domain into a second domain or visa versa can be accomplished with a TxPIC or an RxPIC, respectively.

A still further feature of this invention in its broadest terms on the transmitter side in deploying forward error correction (FEC) in transmission networks is the method of FEC encoding a first multiplexed signal comprising M signals in a first domain at a first baud rate, inverse multiplexing the encoded multiplexed signal of the first domain into N signals in the first domain at a second baud rate, converting the first domain N signals into N signals in a second domain, and combining the second domain N signals at the second baud rate into a combined signal for transport on a transmission medium. On the receiver side, the method is directed to providing a FEC encoded combined signal comprising a plurality of M signals combined in a second domain at a second baud rate, decombining the FEC encoded combined signal of M signals in the second domain into N signals in the second domain, converting the N signals in the second domain into N signals in a first domain, inverse multiplexing the first domain N signals into a first domain multiplexed M signal of M signals at a second baud rate, and FEC decoding the first domain multiplexed M signal. The first baud rate can be higher or lower than the second baud rate or both the first and second baud rates can be the same. The baud rates can be, for example, Kbps, Mbps, Gbps or Tbps. The conversion from the first domain into a second domain or visa versa can be accomplished with a TxPIC or an RxPIC respectively.

Another feature of this invention is the provision of a FEC encoding and decoding of a high baud rate channel signal by FEC encoding the signal prior to its EO conversion and inverse multiplexing the signal into segment channel signals or signal segments that may be plural lower baud rate signals for EO conversion and transmission of the segment channel signals at the lower baud rate. For example, a 10 Gbps channel signal is FEC encoded and then segmented into four 2.5 Gbps signals for EO conversion and optical multiplexed for launching onto the optical transmission medium. Accordingly, a high baud rate signal is FEC encoded and provided over multiple parallel channels at a lower baud rate. The system may, of course, handle more than one such FEC encoded, high data rate signal.

Another feature of this invention is the provision of multiple data sources providing electrical data signals that are initially multiplexed and FEC encoded with a single FEC encoder into a single multiplexed signal, which signal is then inverse multiplexed by demuxing the FEC encoded channel signals into separate electrical signals for EO conversion as optical channel signals of different wavelengths and the optical signals are then optically recombined via an optical multiplexer for transport over an optical transmission medium.

Another feature of this invention is the provision of a decombiner to receive an optical multiplexed signal from an optical transmission medium, demultiplex the multiplexed channel signals received from an optical transmission medium, OE convert the demultiplexed optical channel signals into electrical signals, inverse multiplexed the converted electrical signals into a combined electrical signal for FEC decoding with a single FEC decoder, demultiplexing the decoded, combined signal into separate electrical signals for distribution to respective data sinks.

A further feature of this invention is the provision of combined signal FEC encoding and FEC decoding deploying EO and OE converters respectively comprising a multi-wavelength, optical transmitter photonic integrated circuit (TxPIC) chip in the optical transmitter and a multi-wavelength, optical receiver photonic integrated circuit (RxPIC) chip in the optical receiver.

Another feature of this invention is a transmission system where, in the transmitter, M number of electrical data signals at a first baud rate are combined or multiplexed as a single data signal which is then FEC encoded via a single FEC encoder and then inverse multiplexed by first being demultiplexed into N signal channels at a second baud rate, where M may not be the same number as N, with the N channels being converted into N optical channel signals at the second baud rate and subsequently combined as a single optical multiplexed signal for launching onto a transport medium. The reverse sequence occurs at the receiver, i.e., the N optical channel signals at the second baud rate are decombined, converted into N electrical signals which are multiplexed into the first baud rate with M channel signals, FEC decoded and then demultiplexed into separate M data signals at the first baud rate. The first and second baud rates of the M and N signals can be the same baud rate or different baud rates, i.e., M Gbps>N Gbps or N Gbps>M Gbps.

Another feature of this invention is the application of the method of conversion of FEC encoded, combined M electrical signals at a first baud rate into electrical N signals at a second baud rate which are combined for transport on a transmission medium, such as a wire medium or a wireless medium.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DETAILED DESCRIPTION OF THE INVENTION

Figure 1:
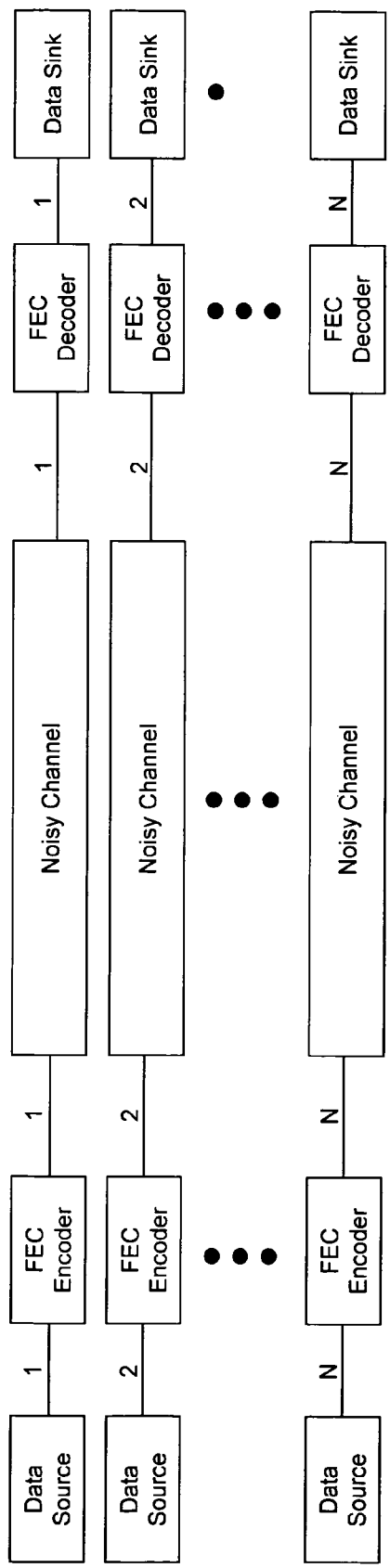
FIG. 1 is a schematic view of a first prior known deployment of FEC encoding in an optical transmission system.
Figure 2:
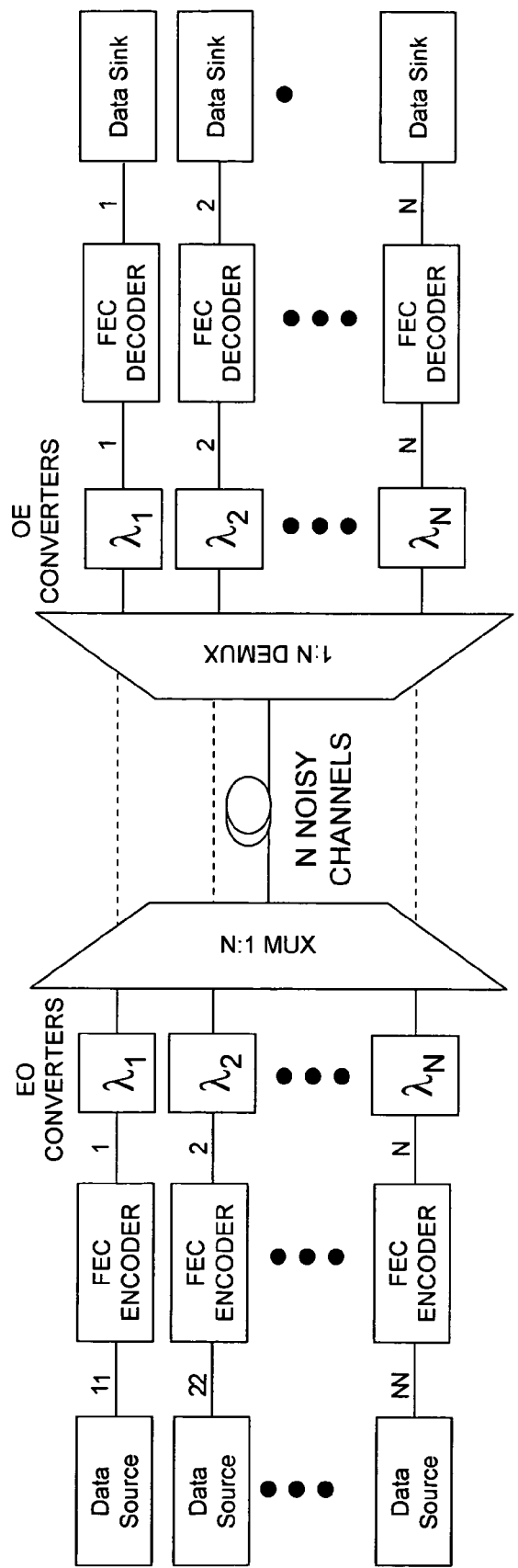
FIG. 2 is schematic view of a second prior known deployment of FEC encoding in an optical transmission system.
Figure 3:
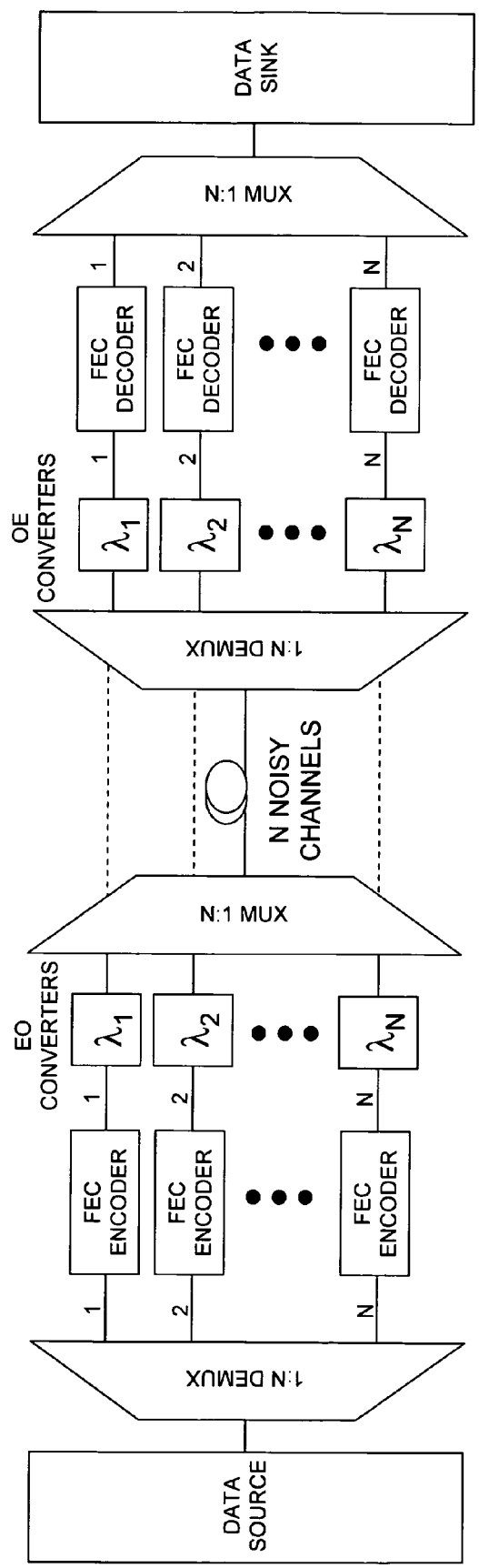
FIG. 3 schematic view of a third prior known deployment of FEC encoding in an optical transmission system.
Figure 4:
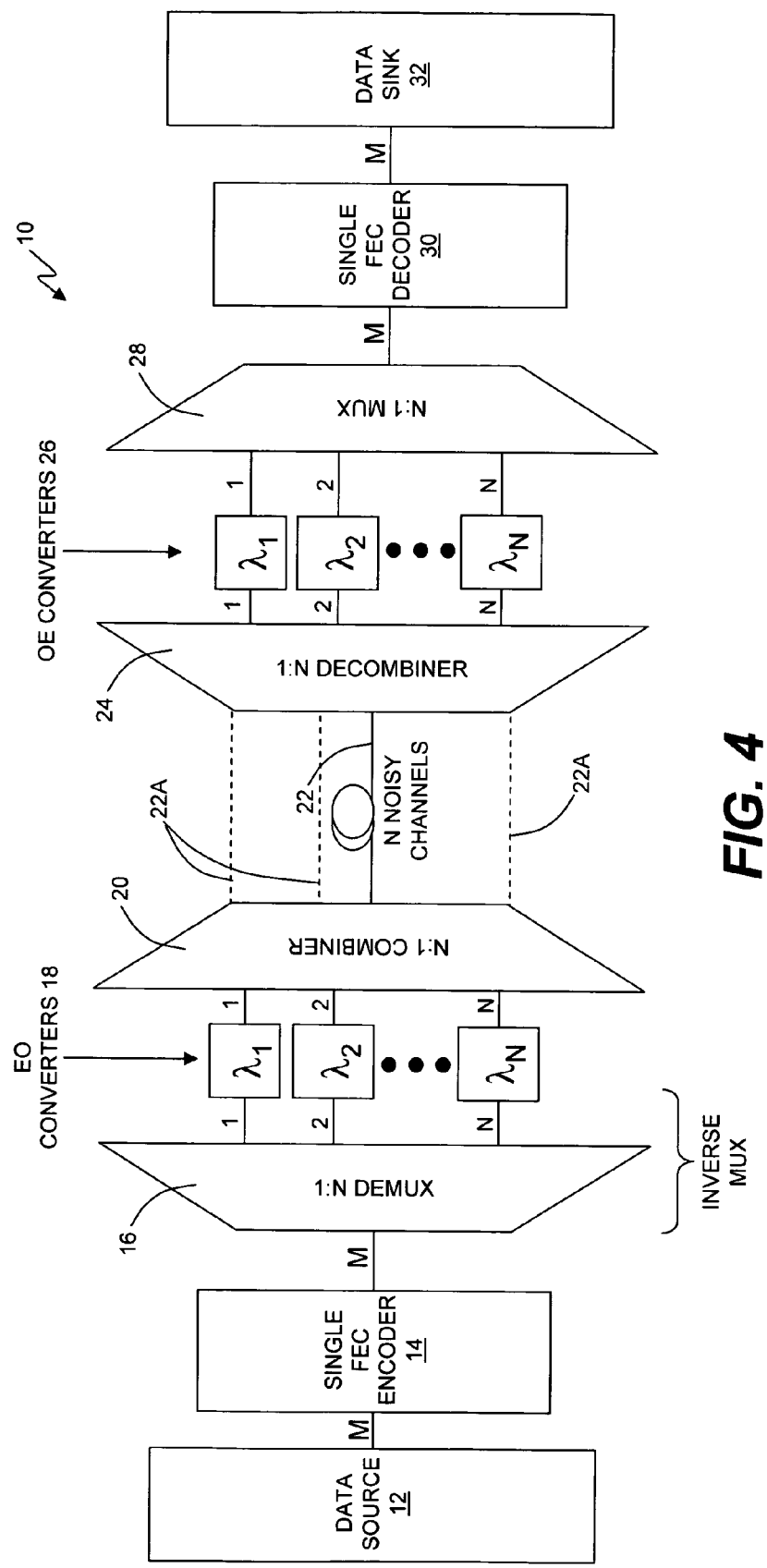
FIG. 4 is schematic view of a first embodiment of this invention.

Reference is now made to FIG. 4 which illustrates a first embodiment of this invention. In FIG. 4, network 10 at an optical transmitter module comprises high data rate source 12, such as a 100 Gbps rate, provides a data signal to a single FEC encoder 14. Data source 12 comprises at least one data signal but generally is an electrical signal of M combined or multiplexed electrical signals. The number of such M signals may be unknown and it is not necessary to know their number since the M multiplexed signal will be disassembled into segment signals. These M signals may be at a baud rate, as an example, of 100 Gbps, 25 Gbps, 10 Gbps or other such value. The combined electrical data signal is FEC encoded and inverse multiplexed by 1:N DEMUX 16 which segments the signal into N channel segments, for example, at a lower bit or baud rate, such as N segments at a lower baud rate, such as, as an example, N=ten 10 Gbps signals, N=ten 2.5 Gbps signals or N=four 2.5 Gbps signals, respectively, with respect to the foregoing M signal exemplified baud rates. The de-MUX or inverse MUX 16 slices up or disaggregates (disassembles) the combined M signal into N electrical signal segments. Said another way, the multiplexed signal is de-interleaved or split up into constituents or segments which can be accomplished in many different ways. At inverse multiplexer 16, a pattern of additional data is placed in each of the N signal segments as overhead to allow detection of a start location at a receiver which are needed to re-interleave the N signal segments back together in proper order at MUX 28 prior to the performance of FEC decoding. The N segments can be, for example, one bit from each de-muxed input at inverse multiplexer 16 in succession or one byte from each de-muxed input at inverse multiplexer 16 in succession and so on. These signal segments are then provided to EO converters 18 that have optical modulator sources that convert the electrical signal segments into respective optical channel signals, $\lambda_1, \lambda_2 \ldots \lambda_N$, which are then optically combined by N:1 combiner 20 and launched onto an optical transmission medium 22. In the case here, combiner 20 may be an optical multiplexer. Thus, the signal segments are converted from the electrical domain into the optical domain. The dotted lines 22A in FIG. 4 represent that traversing of these separate but multiplexed optical signals comprising N noisy signal channels due to impairments of the optical medium. At the optical receiver of network 10, the optical signals are decombined into N separate optical signals by 1:N DEMUX 24 and are then converted into electrical signal segments by OE converters 26 using, for example, an array of photodetectors, one for each N channel signal. Then, the converted electrical signal segments are reassembled via N:1 multiplexer 28 into a higher bit or baud rate signal, such as M=100 Gbps, 25 Gbps or 10 Gbps, as the case may be. Multiplexer 28 combines or aggregates (reassembles) the N electrical signal segments together in an M combined signal of M signals. The M combined signal is next FEC decoded via single FEC decoder 30 and then provided to a data sink 32. In the case where M Gbps>N Gbps, as exemplified in the examples above, the N channel signals represent segments of a FEC encoded M data signal and are transmitted, as recombined, at a lower baud rate and thereafter restored at the receiver to their original higher baud rate. However, it should be understood that the M combined signal and the N signals in FIG. 4 can respectively have baud rates that are the same or N Gbps>M Gbps as well as M Gbps>N Gbps. Also, the respective M and N signal baud rates can be in Kbps, Mbps, Gbps or Tbps.

Figure 5:
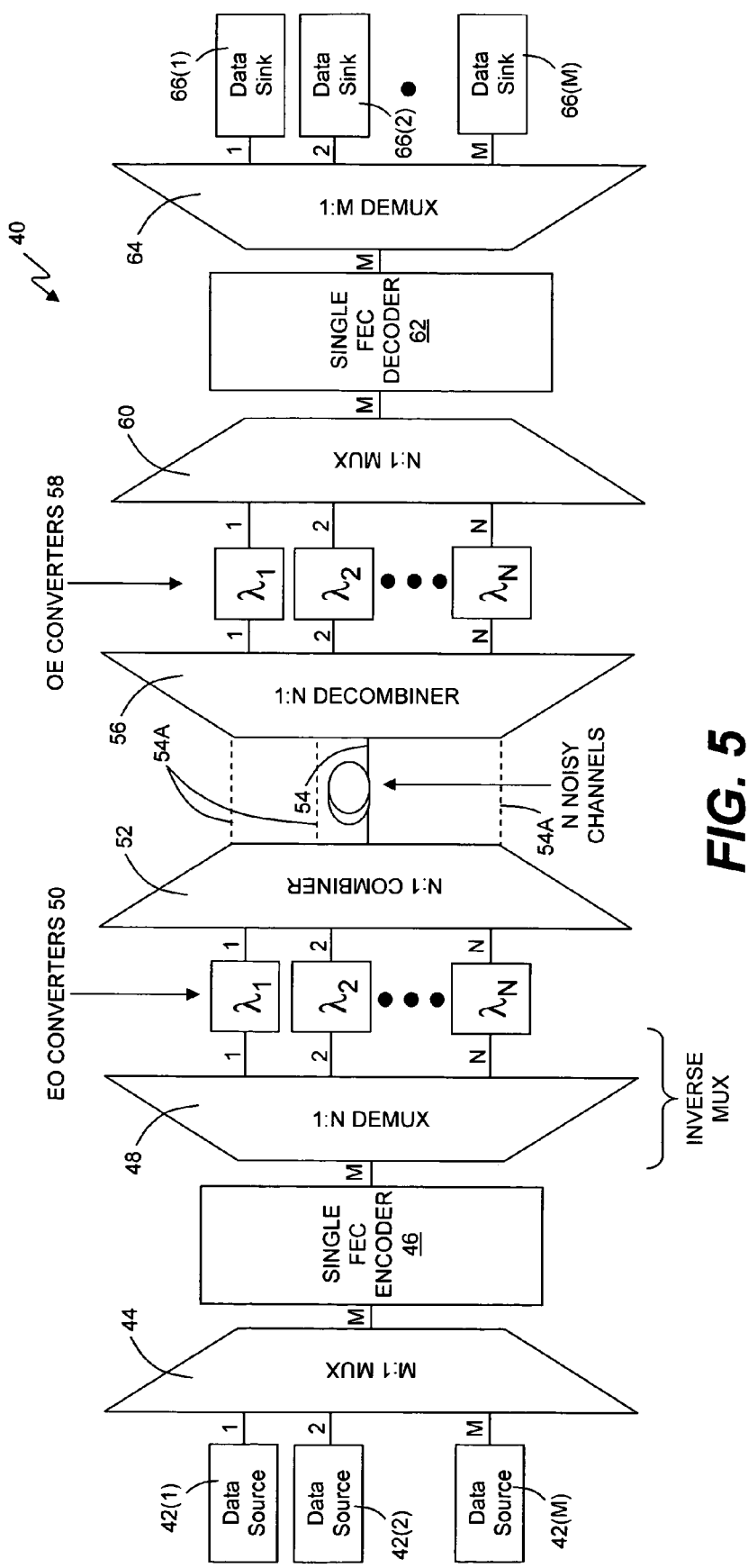
FIG. 5 is schematic view of a second embodiment of this invention.

Reference is now made to FIG. 5 which illustrates a second embodiment of this invention. In FIG. 5, optical transmission network 40 has a plurality of data sources 42(1), 42(2) . . . 42(M) comprising electrical, M data signals which are combined as a M combined signal via M:1 MUX 44 and are provided to single FEC encoder 46 for FEC encoding. The FEC encoded signal is then inverse multiplexed at 1:N inverse multiplexer 48 wherein the M electrical data signals are demultiplexed (disaggregated or disassembled) into N electrical channel signals. M data signals may be equal in number to N channel signals or may be different in number, and M data signals can be at the same or a different baud rate from the baud rate of N channel signals where M Gbps>N Gbps or M Gbps<N Gbps. Next, the N electrical channel signals are EO converted by optical transmitters or converters 50 where the N channel signals are converted into optical modulated signals, $\lambda_1, \lambda_2 \ldots \lambda_N$, after which they are optically combined via N:1 combiner 52 and launched onto the optical transmission medium 54 comprising N noisy channels. As indicated above, the optical channel signals are multiplexed and the dotted lines 54A represent multiple, multiplexed optical signals comprising N noisy signal channels. In the FIG. 5 embodiment, the inverse multiplexing of M known signals in the M multiplexed signal are converted into N known signals are, in turn, converted into N optical channels. In FIG. 4, as previously indicated, the number of such M signal constituents may be unknown so the M signals in the M multiplexed signal are parsed into N signal segments.

One the optical receiver side, the N multiplexed optical signal is decombined or demultiplexed by 1:N decombiner 56, OE converted into N electrical signals by optical converters 58 which may be comprised of N photodetectors. The N electrical channel signals are then multiplexed via N:1 MUX 60 where the N electrical channel signals are aggregated or reassembled into a M electrical signal and then FEC decoded at single FEC decoder 62 and, thereafter, demultiplexed by 1:M DEMUX 64 and respectively provided to M data sinks 66(1), 66(2), . . . (66)(M). Again, M data signals may be equal in number to N channel signals or may be different in number, and M data signals may be at the same, or at different baud rate than the N channel signals where M Gbps>N Gbps or M Gbps<N Gbps.

Figure 6:
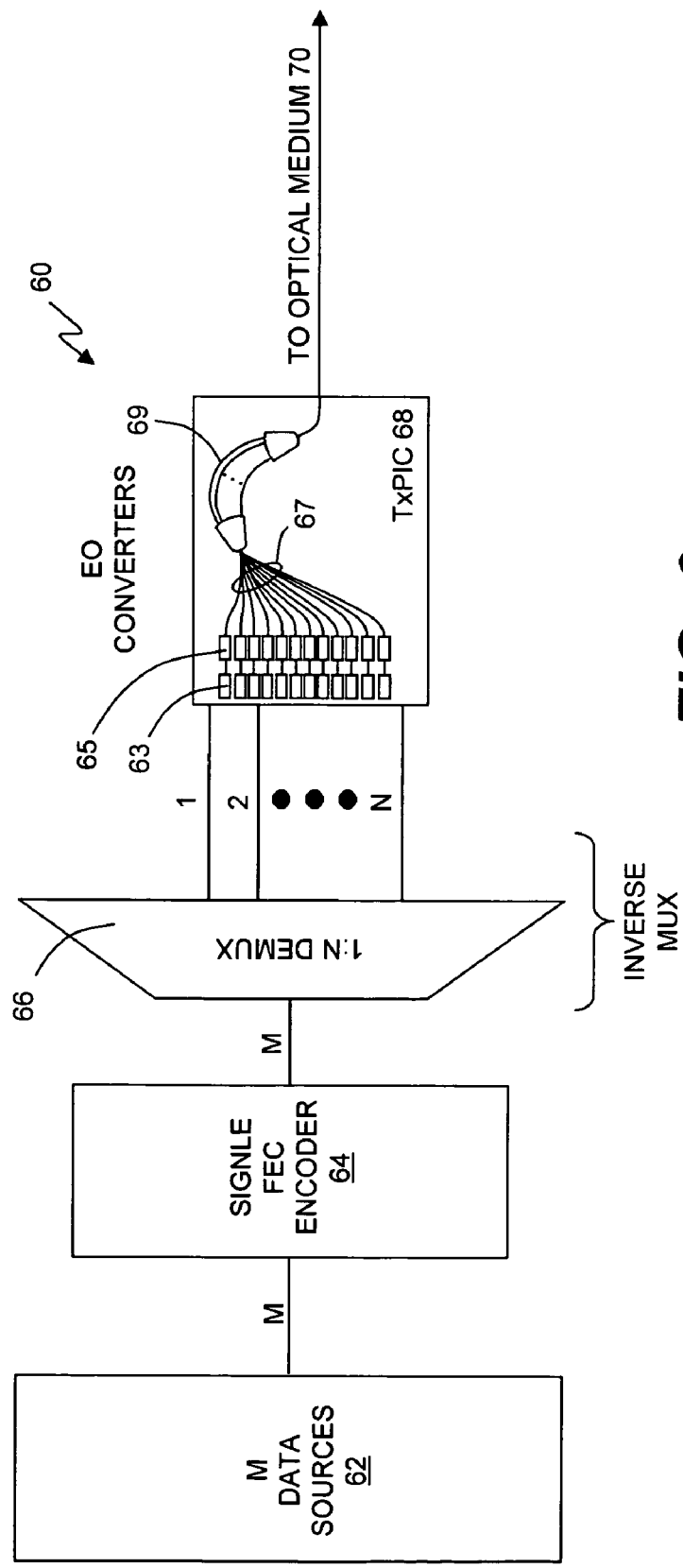
FIG. 6 and FIG. 7 are schematic views of a further embodiment of the second embodiment of this invention.
Figure 7:
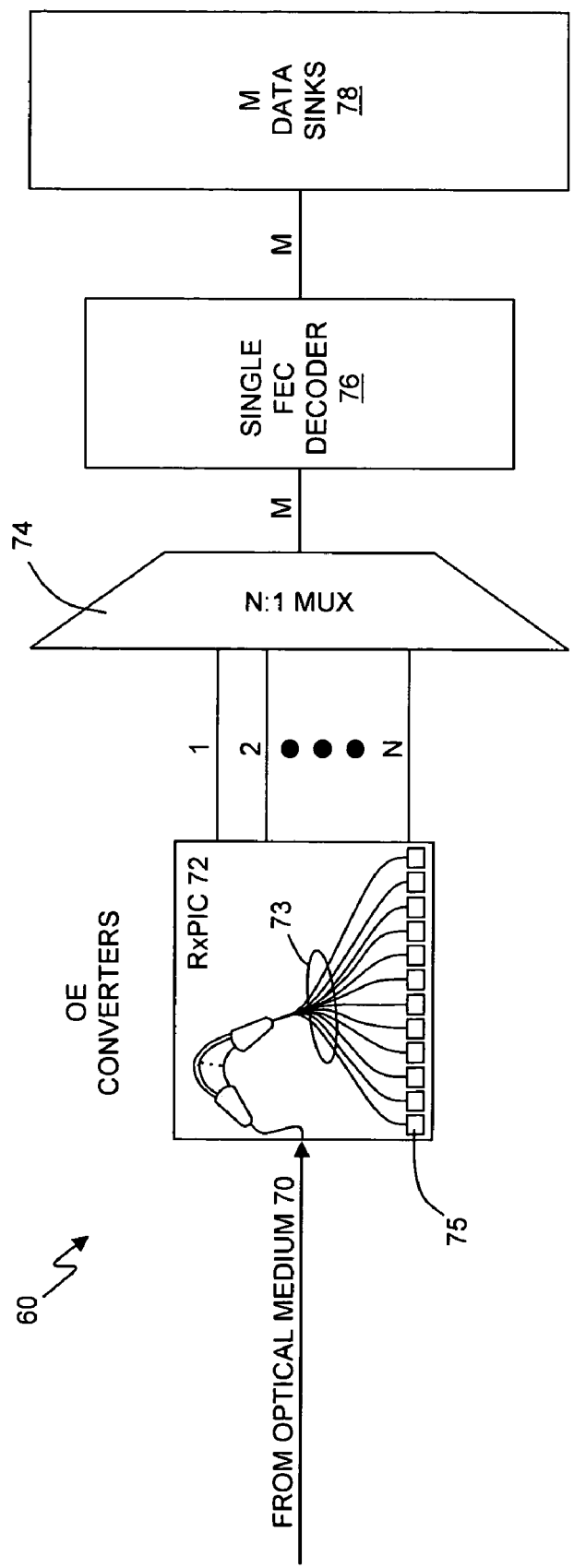

Reference is now made to FIGS. 6 and 7 which illustrate an optical transmission network 60 which is basically the same as the embodiment shown in FIG. 5 except that the EO and OE converters 50 and 58 of FIG. 4 are particular embodiments of an optical, multi-wavelength transmitter photonic integrated circuit (TxPIC) 68 and an optical, multi-wavelength receiver photonic integrated circuit (RxPIC) 72. As shown in FIG. 6, M data sources 62 of M electrical data signals are combined into an M combined signal of M data signal and FEC encoded at single FEC encoder 64. The FEC encoded signal is then provided to inverse multiplexer 66 where the combined M signals are disassembled into N electrical signals. The multiple output signals from inverse multiplexer 66 are provide as multiple inputs to TxPIC chip 68, specially to electro-optic modulators 65. TxPIC 68 shown here comprises N=12 optical signal channels and comprises a monolithic chip having an integrated array of laser sources 63 coupled to a corresponding integrated array of opto-electrical modulators 65 which, in turn, are respectively coupled, via optical waveguides 67, to an integrated optical multiplexer 69 for combining the modulated signals from the N opto-electrical modulators on a single output from TxPIC chip 68 onto optical medium 70. As an example, laser sources 63 may be DFB lasers, opto-electrical modulators 65 may be electro-absorption modulators (EAMs) and optical multiplexer 69 may be an arrayed waveguide grating (AWG). TxPIC chip 68 is described in more detail in U.S. patent applications, Ser. Nos. 10/267,331; 10/267,330 and 10/267,346, all filed on Oct. 8, 2002, owned by the common assignee herein and are all incorporated herein by their reference.

As shown in FIG. 7, RxPIC 72 receives the multiplexed signal of N optical channel signals. Chip 72 comprises N=12 signal channels and comprises a monolithic chip having an integrated optical demultiplexer 71, the outputs of which are respectively coupled, via optical waveguides 73, to one of a plurality of integrated photodetectors 75. As an example, demultiplexer 71 may be an arrayed waveguide grating (AWG) and the array of photodetectors 75 may be an array of PIN photodiodes or an array of avalanche photodiodes (APDs). RxPIC chip 72 is described in more detail in U.S. patent application, Ser. No. 10/267,304, filed Oct. 8, 2002, which application is owned by the common assignee herein and is incorporated herein by its reference. The multiplexed converted signals are then provided to multiplexer 74 which aggregates reassembles the N signals into a single M combined signal comprising M signals. The combined M signal is decoded via single FEC decoder 76 and provided to M data sinks after being decombined or demultiplexed. The combination of uniform distribution of coding gain across all the signal channels in combination with the use of one or more TxPIC chips 68 and one or more RxPIC chips 72 for the generation and reception of optical channel signals make for a powerful high performance optical transmission network with comparatively much less cost over current optical network systems.

Thus, it can seen from the foregoing embodiments that optical signal generation is achieved through reverse multiplexing of the higher baud rate data signal or signals or of the multiplexed, FEC encoded plural data signals which may be EO converted to a different baud rate data signal. Effectively, the coding gain power of the FEC encoder is spread over all the signal channels so that each channel can potentially benefit from performance above the average coding gain thereby increasing the coding gain of the worst noise signal channel and correspondingly reducing its BER at the receiver so that, now, the combined multiple channel signals may be propagated further along the optical transmission medium before signal interception is required, such as required channel signal regeneration (3R). By coding gain averaging, the coding gain is taken from the lesser noise affected channels and spread over all the channels so the higher noised ridden channels obtain an effective increase in coding gain which corresponds to a higher reduction in BER at the optical receiver terminal.

While the invention has been described in conjunction with several specific embodiments, it is evident to those skilled in the art that many further alternatives, modifications and variations will be apparent in light of the foregoing description. As an important example, the foregoing embodiments of FIGS. 4-7 relate generally to a transmitter side conversion of M signals at a first baud rate in the electrical domain into N signals or segments at a second baud rate in the optical domain and visa versa at a receiver side. However, the architecture of this invention is also applicable to a transmitter side conversion of M signals at a first baud rate in the electrical domain into N signals at a second baud rate in the electrical domain, which are then combined for transmission on a wire or wireless medium, and visa versa at the receiver side. Again, M data electrical signals may be equal in number to the N electrical signals or may be different where M Gbps>N Gbps or N Gbps>N Gbps. Also, the principal of this invention is equally applicable to cases where the first domain is the optical domain and the second domain is the electrical domain, via inverse multiplexing at the transmitter, where there is an application for such a domain conversion. Lastly, the principal of this invention is equally applicable to cases where the first domain is the optical domain and the second domain is the optical domain, via inverse multiplexing at the transmitter where there is an application for such a domain conversion. An application would be, for example, at an intermediate node in an optical transmission network where the conversion of one or more first optical data signals is required to be changed from a first baud into second optical data signals at a second higher or lower baud rate for further optical transmission over the network. Thus, the invention described herein is intended to embrace all such alternatives, modifications, applications and variations as may fall within the spirit and scope of the appended claims.

What is claimed is:

1. A communication method, comprising the steps of:
   FEC encoding a signal in a first domain, the signal being a first domain signal;
   demultiplexing the FEC encoded first domain signal into N segments in the first domain;
   inserting data into each of the N segments, the data indicating a start location associated with said each of the N segments;
   converting the N segments in the first domain into N segments in a second domain; and
   combining the second domain N segments into a combined signal in the second domain for transport on a transmission medium,
   wherein the first domain is an electrical domain and the second domain is an optical domain.

2. The method of claim 1 wherein the first domain signal is at a first baud rate and the first and second domain signal N segments are at second baud rate.

3. The method of claim 2 wherein the first baud rate is higher than the second baud rate.

4. The method of claim 2 wherein the second baud rate is higher than the first baud rate.

5. The method of claim 2 wherein the first and second baud rates are the same.

6. The method of claim 1 wherein the where the step of converting comprises a monolithic photonic integrated circuit (PIC) having integrated N signal channels for converting a respective signal segment in the first domain into a signal segment in the second domain and multiplexing the N channel signal segments to form the combined signal.

7. A method for deploying forward error correction (FEC) in transmission networks, comprising the steps of:
   FEC encoding a first multiplexed signal comprising M signals in a first domain at a first baud rate;
   demultiplexing the encoded multiplexed signal of the first domain into N signals in the first domain at a second baud rate, each of the N signals carrying a plurality of segments;
   inserting data into each of the plurality of segments, the data indicating a start location of said each of the plurality of segments;
   converting the first domain N signals into N signals in a second domain; and
   combining the second domain N signals at the second baud rate into a combined signal for transport on a transmission medium,
   wherein the first domain is an electrical domain and the second domain is an optical domain.

8. The method of claim 7 wherein the first baud rate is higher than the second baud rate.

9. The method of claim 7 wherein the second baud rate is higher than the first baud rate.

10. The method of claim 7 wherein the first and second baud rates are the same.

11. The method of claim 7 wherein the where the step of converting comprises a monolithic photonic integrated circuit (PIC) having integrated N signal channels for converting a respective N signal in the first domain into a N signal in the second domain and multiplexing the N channel signals to form the combined signal.

12. A method for deploying forward error correction (FEC) in transmission networks, comprising the steps of:
    decombining an FEC encoded combined signal in a first domain and received from a transmission medium into N segments in the first domain;
    converting the N segments in the first domain into N segments in a second domain;
    detecting a start location of each of the N segments based on data included in the N segments;
    multiplexing the second domain N segments into a multiplexed M signal comprising M signals in the second domain; and
    FEC decoding the first domain multiplexed M signal,
    wherein the first domain is an optical domain and the second domain is an electrical domain.

13. The method of claim 12 wherein the first domain signal is at a first baud rate and each of the second domain signal N segments are at a second baud rate.

14. The method of claim 13 wherein the first baud rate is higher than the second baud rate.

15. The method of claim 13 wherein the second baud rate is higher than the first baud rate.

16. The method of claim 13 wherein the first and second baud rates are the same.

17. The method of claim 12 wherein the where the step of converting comprises a monolithic photonic integrated circuit (PIC) having integrated N signal channels converting a respective signal segments in the first domain into signal segment a in the second domain and multiplexing the N channel signal segments to form the combined signal.

18. A method for deploying forward error correction (FEC) in transmission networks, comprising the steps of:
    providing an FEC encoded combined signal comprising a plurality of M signals combined in a first domain at a second baud rate;
    decombining the FEC encoded combined signal of M signals in the first domain into N signals in the first domain;
    converting the N signals in the second domain into N signals in a second domain, each of the N signals including a plurality of segments;
    inserting data into each of the plurality of segments, the data indicating a start location of said each of the plurality of segments;
    multiplexing the second domain N signals into a second domain multiplexed M signal of M signals at a second baud rate; and
    FEC decoding the second domain multiplexed M signal,
    wherein the first domain is an optical domain and the second domain is an electrical domain.

19. The method of claim 18, wherein the plurality of M signals is a first plurality of M signals, the method further comprising the step of demultiplexing the FEC decoded multiplexed M signal into a second plurality of M signals and forwarding each of the plurality of M signals to a corresponding one of data sinks.

20. The method of claim 18 wherein the first baud rate is higher than the second baud rate.

21. The method of claim 18 wherein the second baud rate is higher than the first baud rate.

22. The method of claim 18 wherein the first and second baud rates are the same.

23. The method of claim 18 wherein the where the step of converting comprises a monolithic photonic integrated circuit (PIC) having integrated N signal channels converting a respective N signal in the second domain into an N signal in the first domain and multiplexing the N channel signals to form the combined signal.

24. A transmission network having a transmitter side and a receiver side, comprising:
   said transmitter side comprising:
      a plurality data sources for providing a multiplexed M signal including M signals in a first domain and modulated at a first baud rate;
      an FEC encoder for encoding the multiplexed M signal;
      a demultiplexer circuit that converts the encoded multiplexed M signal into N signal segments, each of the N signal segments being at a second baud rate in the first domain and including data, the data indicating a start location of said each of the N signal segments;
      a first converter for converting the N signal segments in the first domain into N signal segments of a second domain; and
      a combiner for combining the N signal segments of a second domain into a combined signal in the second domain for transport on a transmission medium;
   said receiver side comprising:
      a decombiner for receiving said combined signal in the second domain from the transmission medium and decombing said combined signal into N segments in the second domain
      a second converter for converting the N segments in the second domain into N segments in the first domain;
      a multiplexer for converting the first domain N segments at a first baud rate into a multiplexed M signal at a second baud rate comprising said first domain M signals each at the first baud rate; and
      an FEC decoder for decoding the multiplexed M signal, wherein the first domain is an electrical domain and the second domain is an optical domain.

25. The transmission network of claim 24 wherein said first converter on said transmitter side comprises a monolithic photonic integrated circuit (PIC) having N signal channels for converting a respective N signal segment in the first domain into a respective N signal segment in the second domain and multiplexing the N channel signal segments to form the combined signal.

26. The transmission network of claim 25 wherein said first domain comprises an electrical domain and said second domain comprises an optical domain; said monolithic photonic integrated circuit (PIC) comprises an array of N laser sources, an array of N optic-electric modulators and an optical combiner to combine N optical signal segments into said combined signal for transport on said transmission medium; said transmission medium comprising an optical fiber.

27. The transmission network of claim 26 wherein said laser sources comprise an array of DFB lasers or DBR lasers.

28. The transmission network of claim 26 wherein said electro-optic modulators comprise an array of electro-absorption modulators or Mach-Zehnder modulators.

29. The transmission network of claim 26 wherein said optical combiner comprises an arrayed waveguide grating (AWG) or an Echelle grating.

30. The transmission network of claim 24 wherein said second converter on said receiver side comprises a monolithic photonic integrated circuit (PIC) comprising a demultiplexer for decombining the combined signal into N signal segments and converting a respective N signal segment in the second domain into a respective N signal segment in the first domain.

31. The transmission network of claim 30 wherein said first domain comprises an electrical domain and said second domain comprises an optical domain; said monolithic photonic integrated circuit (PIC) comprises an optical decombiner for decombing said combined signal into N optical signal segments and an array of photodetectors for each converting a respective optical signal segment into a respective electrical signal segment.

32. The transmission network of claim 30 wherein said decombiner comprises an arrayed waveguide grating (AWG) or an Echelle grating.

33. The transmission network of claim 30 wherein said array of photodetectors comprise an array of PIN photodiodes or an array of avalanche photodiodes.

* * * * *